(12) United States Patent
Bellamy et al.

(10) Patent No.: US 6,373,505 B1
(45) Date of Patent: Apr. 16, 2002

(54) SPACE-CONSERVING INTERFACE CONTROL FOR PRESENTING AND MANIPULATING MULTIDIMENSIONAL STATE

(75) Inventors: Rachel Katherine Emma Bellamy, Bedford; Vicki Lynne Hanson, Chappaqua; Wendy A. Kellogg, Yorktown Heights; John Thomas Richards, Chappaqua; Calvin Bruce Swart, Poughkeepsie, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/356,531

(22) Filed: Jul. 19, 1999

(51) Int. Cl.[7] ................................................. G09G 5/00
(52) U.S. Cl. ..................... 345/772; 345/736; 345/817; 345/840; 345/859; 345/861; 709/223; 709/224
(58) Field of Search ................................. 345/736, 772, 345/817, 840, 855, 859, 861, 808, 809, 818; 709/223, 224

(56) References Cited

U.S. PATENT DOCUMENTS 5,644,334 A * 7/1997 Jones et al. ................. 345/419
6,112,015 A * 8/2000 Planas et al. ................ 709/223

* cited by examiner

Primary Examiner—Ba Huynh
(74) Attorney, Agent, or Firm—Douglas W. Cameron

(57) ABSTRACT

A method and apparatus for displaying information on a display device of limited display area. More specifically, an array of elements is formed on the display where each of the elements represents an attribute and has graphical information indicating the state of the attribute. Further, the position of each element in the array represents its position in a collection of attributes. Each element is also user selectable, so that when the element is selected, further information on the attribute is displayed.

11 Claims, 6 Drawing Sheets

SPACE-CONSERVING INTERFACE CONTROL FOR PRESENTING AND MANIPULATING MULTIDIMENSIONAL STATE

TECHNICAL FIELD

This invention relates to a method and apparatus for displaying information in an electronic display of limited display size.

BACKGROUND OF THE INVENTION

Shown in FIG. 1 is an application for a hand-held device in which a piece of student work is being scored along a number of dimensions or attributes. As is typical of the current state of the art, the attribute/value pairs in this application are "hidden" behind a pair of interface controls. The upper control 100 shows the currently selected attribute, in this case "Approach & Reasoning". The lower control 101 shows the value currently associated with this attribute, in this case "3".

To select another attribute in this environment, the user would typically click on the upper control's downward pointing triangle, 102. This would cause the list of all attributes 103 to be displayed as shown in FIG. 2.

clicking on one of the list elements would switch the currently selected attribute to this attribute. Assume in this case that the third element in the list 104 was tapped. The current state of this "Solution" attribute 105 is "Not Scored". This is depicted in FIG. 3.

Let us assume that the user of this application was interrupted at this point and returned to the application several minutes later. How would the user know what had been scored? If the user had been rigorous about scoring items in order (not the case here), the user would know which attribute to score next by examining the popped up list of attributes and selecting the one after the one they saw in the control itself. But, if the user adopted the quite reasonable approach of ordering their scoring of the individual attributes by some other scheme (as was the case here) the user would have no way of knowing how much he/she had completed other than by examining each attribute in turn while trying to remember the completion status of each attribute.

OBJECTS OF THE INVENTION

It is an object of this invention to facilitate display of multidimensional information on an electronic display of limited display size.

SUMMARY OF THE INVENTION

Limited display size on pervasive computing devices such as the IBM Workpad make it hard to display multidimensional information. While it is possible to switch between dimensions or attributes, it is difficult to know which attributes you have viewed or acted upon and similarly difficult to know where in the overall set of dimensions you are currently operating (that is, is it the first one, the last one, the one in the middle of the set etc.). This invention is a user interface control that makes it easy to see this information at a glance while also allowing rapid and direct switching between attributes based on position in the set (which takes advantage of human perception and muscle memory). This control is especially advantageous for the small displays of pervasive computing devices, but is not limited to use on these devices.

More specifically, with this invention, an array of geometric elements is formed where each of the elements represents an attribute and where the position of each of the elements in the array represents its position in a list of attributes. Also, each element has graphical information indicating the state of the attribute which it represents.

Each of the elements can also be made user selectable so as to provide further information about a specific attribute.

BACKGROUND OF THE INVENTION

Shown in FIG. 1 is an application for a hand-held device in which a piece of student work is being scored along a number of dimensions or attributes. As is typical of the current state of the art, the attribute/value pairs in this application are "hidden" behind a pair of interface controls. The upper control 100 shows the currently selected attribute, in this case "Approach & Reasoning". The lower control 101 shows the value currently associated with this attribute, in this case "3".

To select another attribute in this environment, the user would typically tap on the upper control's downward pointing triangle, 102. This would cause the list of all attributes 103 to be displayed as shown in FIG. 2.

Tapping on one of the list elements would switch the currently selected attribute to this attribute. Assume in this case that the third element in the list 104 was tapped. The current state of this "Solution" attribute 105 is "Not Scored". This is depicted in FIG. 3.

Let us assume that the user of this application was interrupted at this point and returned to the application several minutes later. How would the user know what had been scored? If the user had been rigorous about scoring items in order (not the case here), the user would know which attribute to score next by examining the popped up list of attributes and selecting the one after the one they saw in the control itself. But, if the user adopted the quite reasonable approach of ordering their scoring of the individual attributes by some other scheme (as was the case here) the user would have no way of knowing how much he/she had completed other than by examining each attribute in turn while trying to remember the completion status of each attribute.

DESCRIPTION OF PREFERRED EMBODIMENT

Figure 1:
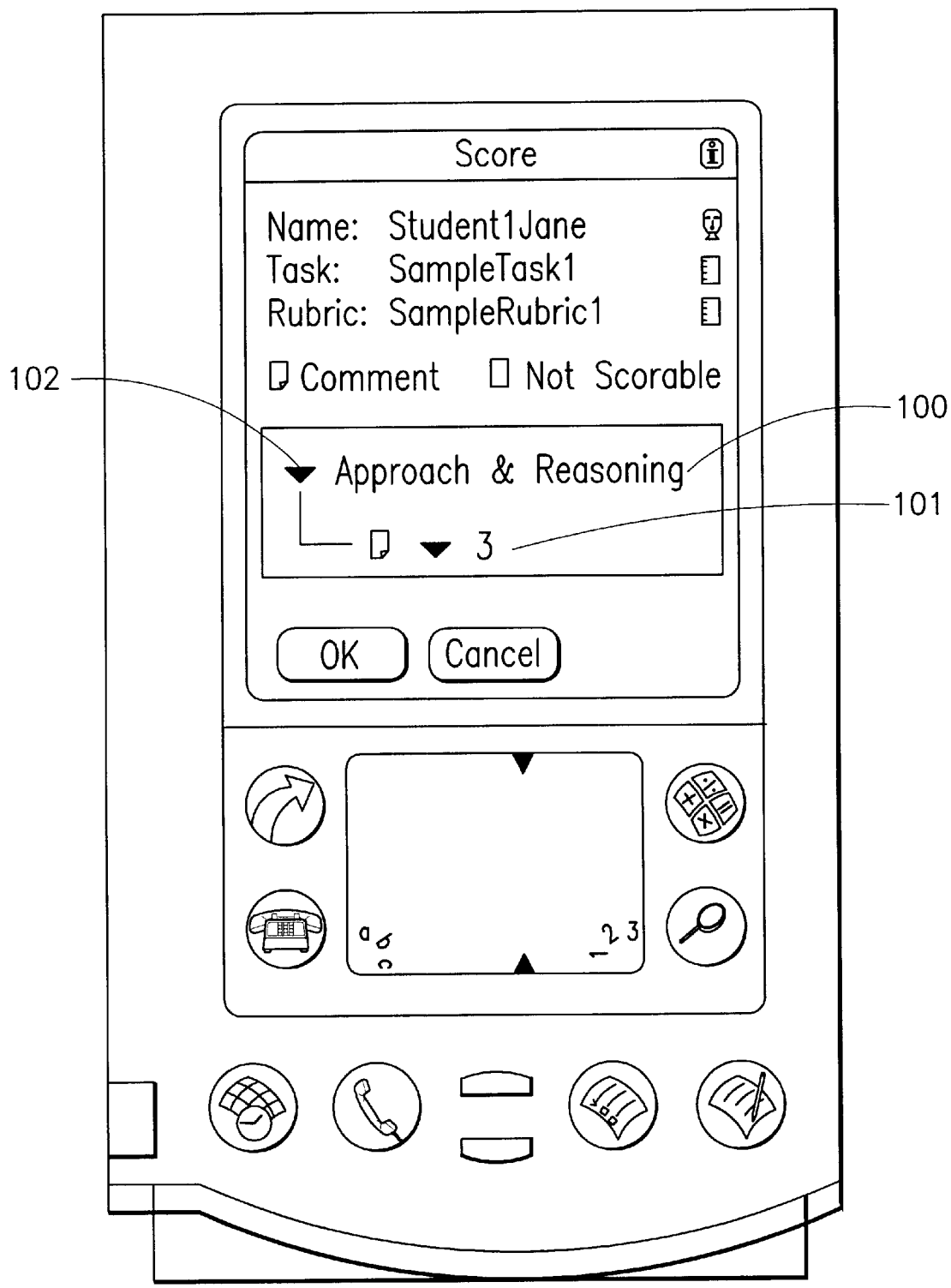
FIG. 1 illustrates a display with limited display area in accordance with the prior art.
Figure 2:
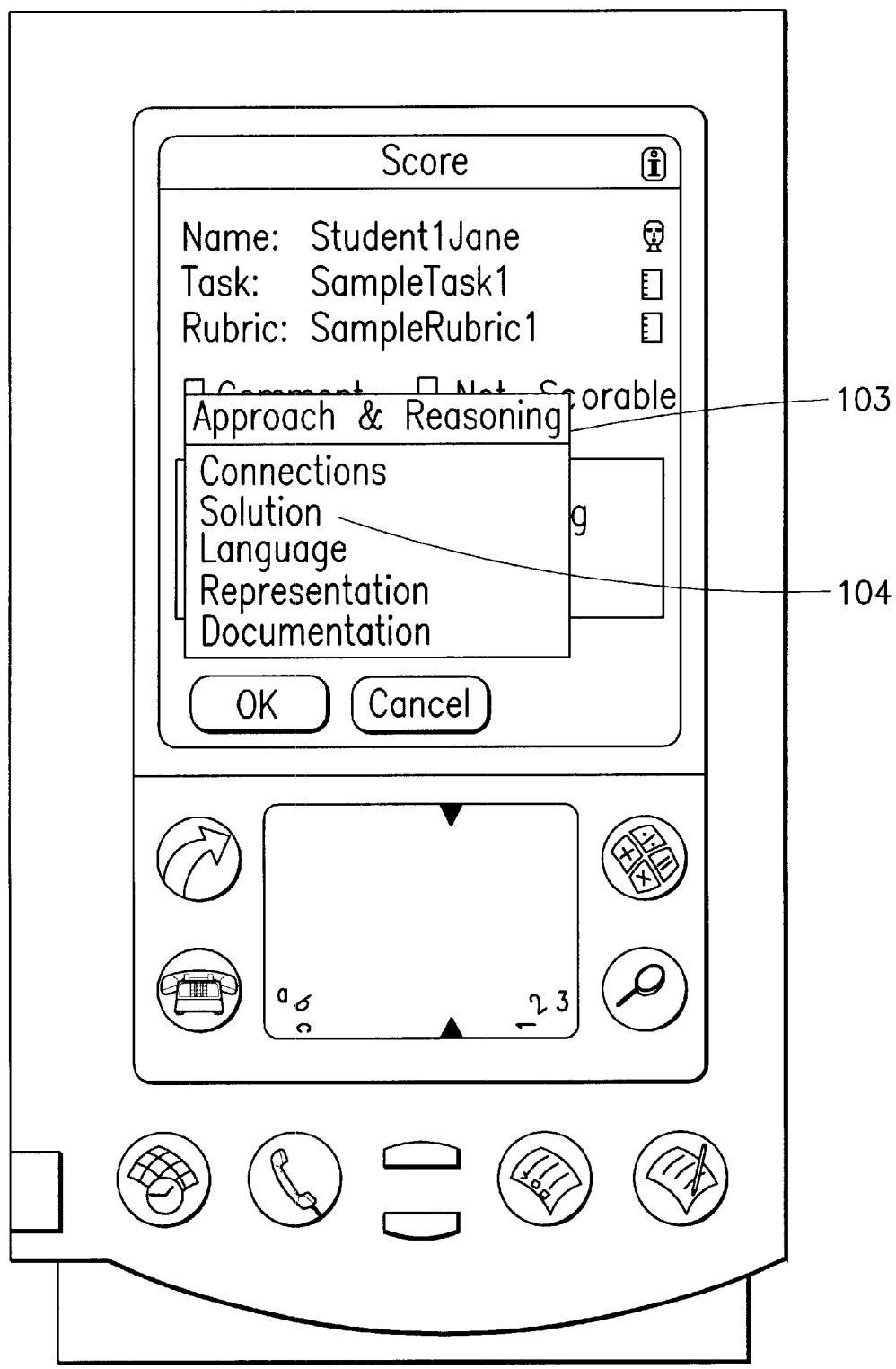
FIG. 2 illustrates the response to "tapping" or "clicking" on the arrow in FIG. 1, where in FIG. 2 a list of elements is displayed.
Figure 3:
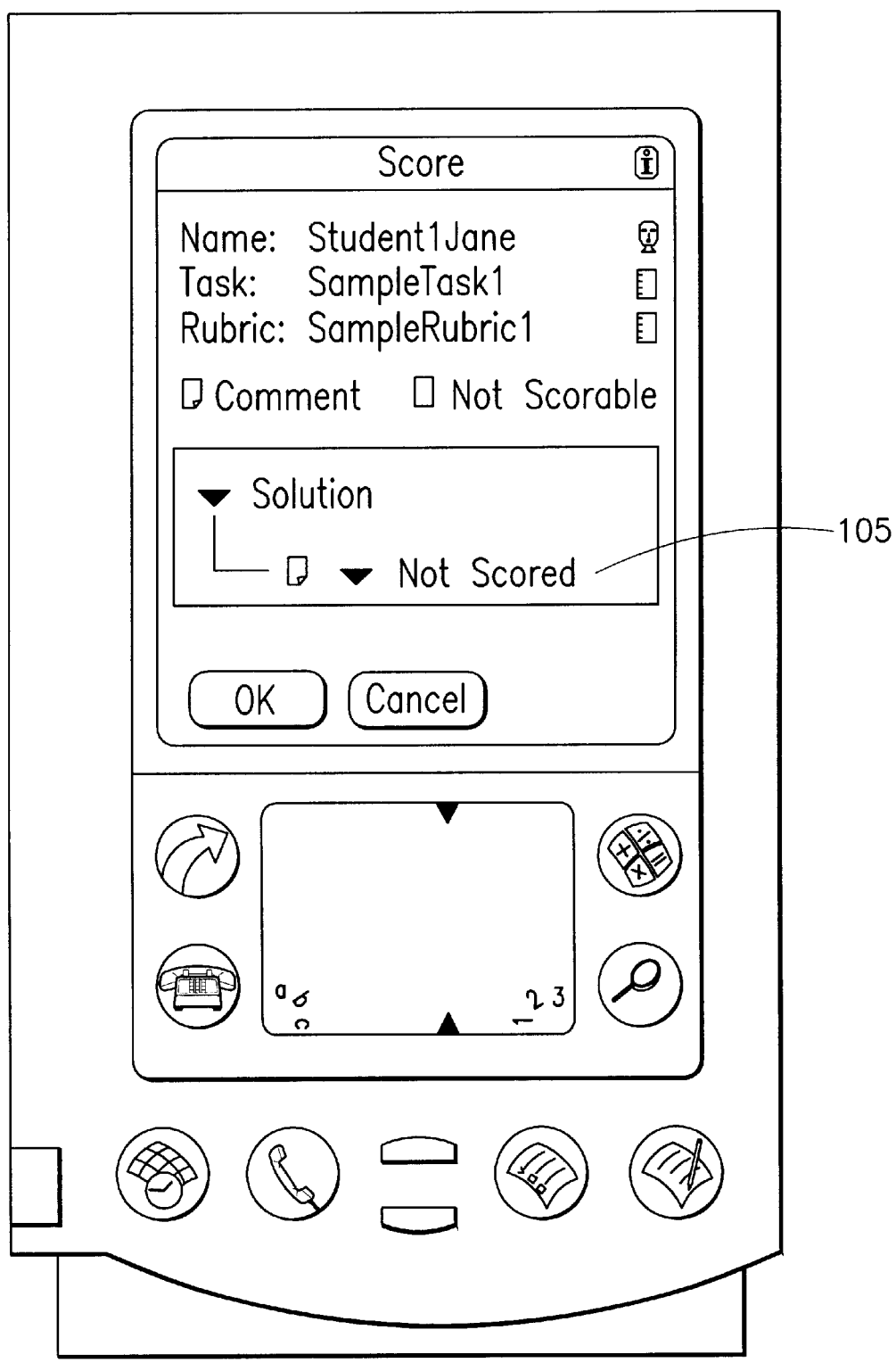
FIG. 3 shows the response to "clicking" on one of the elements listed in FIG. 2.
Figure 4:
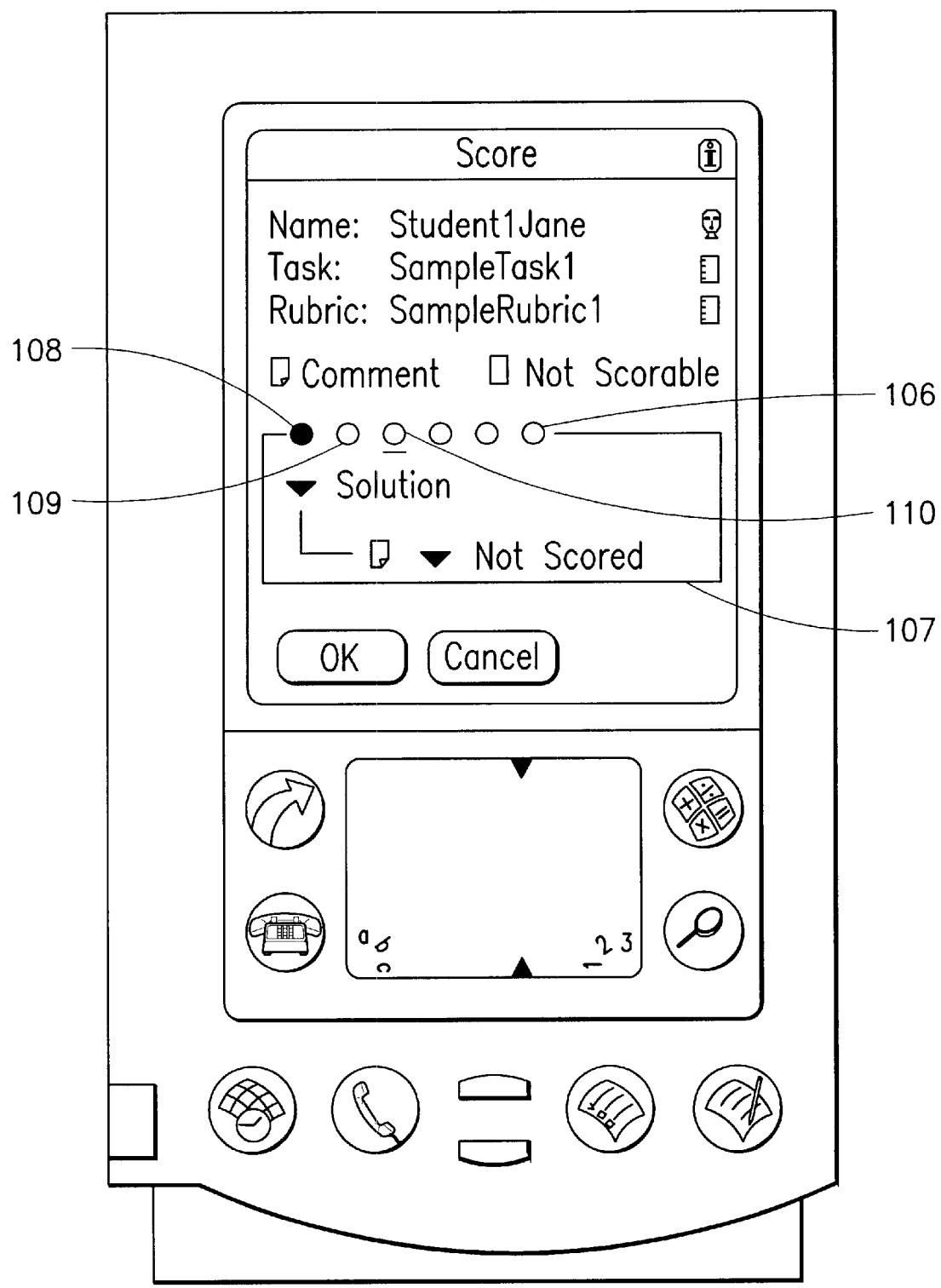
FIG. 4 illustrates the electronic display system in accordance with the invention, where there is an array of geometric elements with each element representing at one of a number of attributes and where the position of the elements in the array corresponds to its position in a collection of attributes. Also shown is the graphical information indicating the state of each of the attributes.

Shown in FIG. 4 (which corresponds to the same logical application state as FIG. 3), is a set of "beads" 106 arrayed along the top edge of the group box 107 setting off the pair of attribute/value popup controls. Each bead represents one of the attribute/value pairs. The left most bead 108 represents the first attribute in the popup list of attributes. The second bead 109 represents the second attribute and so on. The appearance of each bead represents a meaningful state of the value associated with the attribute. In this simple example, all the beads but the first one are represented by unfilled circles. While any suitable graphic convention could be used to indicate state, this example maps a filled circle to "has been scored" and an unfilled circle to "not yet scored". Looking at this array of beads 106, one sees that it is immediately obvious that the first attribute has been scored. See bead 108. The array also indicates that the third attribute is the currently selected one (the line 110 under the third bead denotes this in the current implementation) and that it has not yet been scored.

Figure 5:
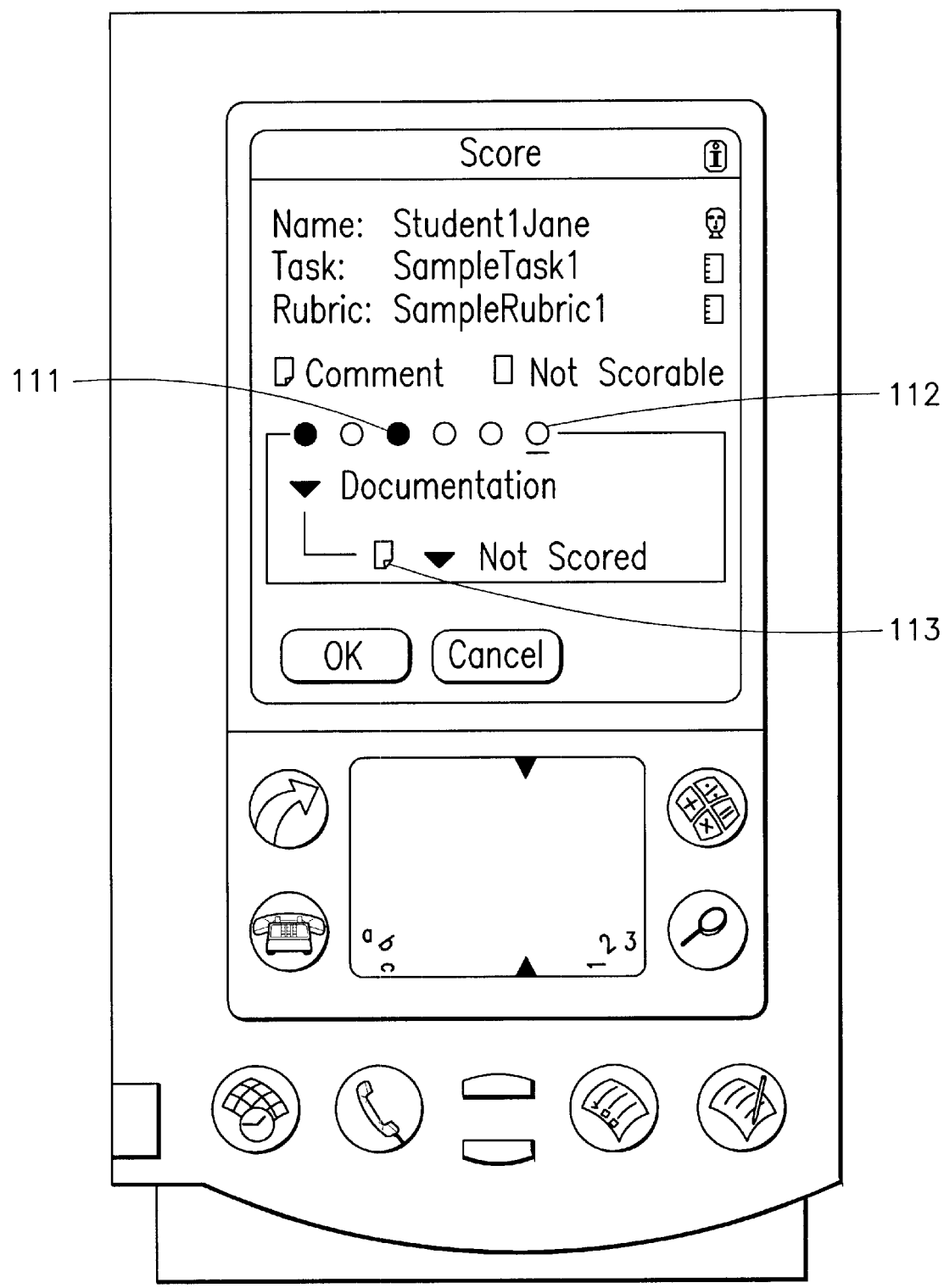
FIG. 5 is the same as FIG. 4 but with a different selected attribute as indicated by the underlined "bead".

The invention thus provides a useful overall visualization aid supporting the task of assigning a value to each attribute in a set. The invention can also be used as a navigation aid. Any of the beads can be tapped or clicked. If tapped, the corresponding attribute/value pair becomes the currently selected attribute and is shown in the upper control in the pair of controls. The current value for this attribute is shown in the lower control. The state is depicted in FIG. 5. Here one sees the state of the application after the third element or bead was scored and the right most bead 112 was tapped.

Of course, the conventional means of switching between attributes can still be employed. As before, the user could pop up the attribute list 103 and select an attribute. In this case, the bead array would reflect the attribute selected by the user by placing a line 110 under the corresponding bead.

Figure 6:
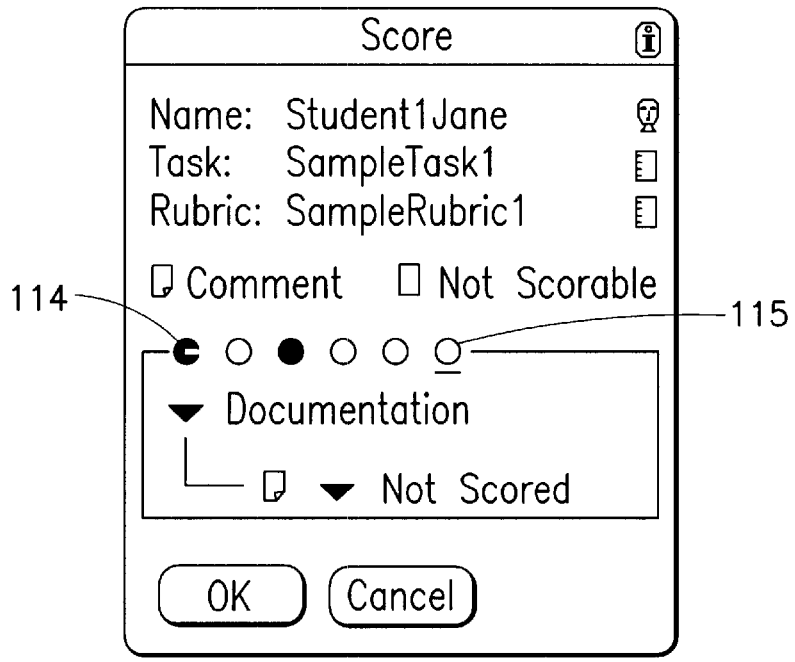
FIGS. 6 and 7 are alternate implementations of the inventions.
Figure 7:
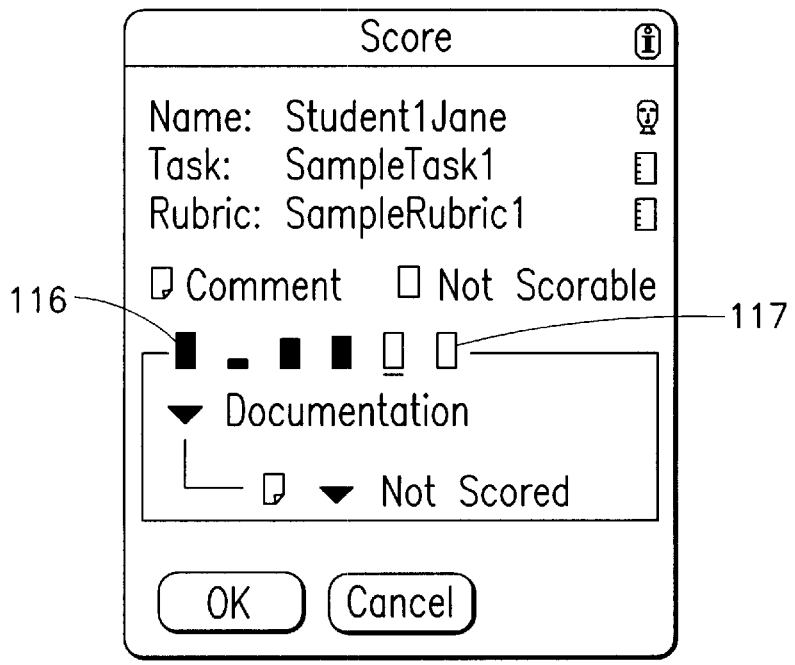

Described above is a simple example in which a two-state bead is associated with each attribute/value pair. The number of states that can be mapped to a bead is limited only by the suitability and understandability of the corresponding graphic mappings. In the current application, one might, for example, choose to elaborate on the bead state to also indicate that a comment had been associated with the value. Note in the figures above that a comment can be added by tapping on the document icon at the left of the lower popup control. FIG. 6 shows a technique in which the presence of a comment is indicated by removing a "notch" in the right side of either the filled, 114, or unfilled, 115, circle (think of a "C" standing for comment). In another case as shown in FIG. 7, one might be interested in showing the overall distribution of scores for a student. Here, one might use a scheme that maps each individual score to a bead shaped like a vertical bar. The height of each of the filled bars, 116 being the first, corresponds to the value of the scored attribute. An empty bar, 117, represents the unscored state. This technique would directly show the distribution while still allowing basic completion state visualization and direct navigation. On a device supporting color, one might map saturation or hue to meaningful values, and so on.

The invention is not limited to a single, horizontal array of beads. The beads could be arrayed vertically if the application design required it. Or the beads could be arrayed within a two dimensional grid, an arc, or within any other meaningful configuration. The key point is that the "bead" array represents the underlying state of the attribute/value pairs and that the spatial arrangement of the beads corresponds in some meaningful way to the underlying topology of the attributes.

The invention requires both the ability to transmit signals to a display device and to receive user selection events pertaining to elements displayed on this device. The embodiment can take any of a number of forms familiar to those skilled in the art. For example, the device can be a computer with an attached display screen and a mouse or keyboard to select one of the display elements at a time and signal this selection. The device can be a hand-held computer such as a pocket organizer The invention requires both the ability to transmit signals to a display device and to receive user or personal information manager in which elements on the display are tapped with a stylus. The device can be a display-equipped wireless communications device such as a pager or cellular telephone in which navigation and selection is carried out by movement and selection buttons. The device can be a fixed-function, information appliance such as a hand-held computer programmed to perform only one task such as inventory checking or recording the completion of steps in a manufacturing process.

Having thus described our invention, what we claim as new and desire to secure by Letters Patents is:

1. In an electronic display system, a method of displaying information on a display device of said system, said method comprising:

forming an array of user selectable elements on said display, each of said elements representing at least one of a plurality of attributes and a position of each of said elements in said array representing its position in a collection of said attributes, and each of said elements having graphical information indicating the state of a corresponding one of said attributes; and providing additional information about a state of a corresponding element when latter said element is selected.

2. A method as recited in claim 1, wherein the said graphical information represents that there is a value associated with a corresponding one of said attributes and wherein said other state represents that there is no value associated with a corresponding one of attributes.

3. A method as recited in claim 1, wherein the said graphical information represents that there is a particular value associated with a corresponding one of said attributes.

4. A method as recited in claim 1, wherein said array of elements is an array of circles in a row.

5. A method as recited in claim 4, wherein each of said circles when filled represents one state and when empty represents another state.

6. In an electronic display system, an apparatus for displaying information on a display device of said system, said apparatus comprising:

a transmitter for transmitting signals to said display device to cause said display device to form an array of elements on said display, each of said elements representing at least one of a plurality of attributes and a position of each of said elements in said array representing its position in a list of said attributes, and each of said elements having graphical information indicating the state of a corresponding one of said attributes; and a receiver for receiving user selection input for elements displayed on said device wherein said display device displays additional information about the state of at least one of said attributes in response to said user selection input.

7. An apparatus as recited in claim 6, wherein said transmitter is a computer.

8. An apparatus as recited in claim 6, wherein said transmitter is a hand-held computer.

9. An apparatus as recited in claim 6, wherein said transmitter is a wireless communications device.

10. An apparatus as recited in claim 6, wherein said transmitter is a fixed function information device.

11. A program storage device readable by a machine, tangibly embodying a program of instructions executable by the machine to perform method steps for:

forming an array of user selectable elements on said display, each of said elements representing at least one of a plurality of attributes and a position of each of said elements in said array representing its position in a collection of said attributes, and each of said elements having graphical information indicating the state of a corresponding one of said attributes; and providing additional information about a state of a corresponding element when latter said element is selected.

\* \* \* \* \*